United States Patent
Heath, III et al.

(10) Patent No.: US 11,198,267 B2
(45) Date of Patent: Dec. 14, 2021

(54) BULK FACTOR COMPENSATED TOOL FOR FABRICATION OF A COMPOSITE PART

(71) Applicant: The Boeing Company, Chicago, IL (US)

(72) Inventors: Richard E. Heath, III, Chicago, IL (US); Richard A. Prause, Chicago, IL (US); Eileen Miller, Chicago, IL (US)

(73) Assignee: The Boeing Company, Chicago, IL (US)

( * ) Notice: Subject to any disclaimer, the term of this patent is extended or adjusted under 35 U.S.C. 154(b) by 355 days.

(21) Appl. No.: 16/173,440

(22) Filed: Oct. 29, 2018

(65) Prior Publication Data

US 2020/0130291 A1    Apr. 30, 2020

(51) Int. Cl.
| | | |
|---|---|---|
| *B29C 70/34* | (2006.01) | |
| *B29C 70/44* | (2006.01) | |
| *B29C 65/00* | (2006.01) | |
| *B29L 31/30* | (2006.01) | |
| *B29C 70/38* | (2006.01) | |
| *B29D 99/00* | (2010.01) | |
| *B29C 35/02* | (2006.01) | |

(52) U.S. Cl.
CPC ...... *B29D 99/0014* (2013.01); *B29C 35/0227* (2013.01); *B29C 70/342* (2013.01); *B29C 70/44* (2013.01); *B29C 66/81261* (2013.01); *B29C 70/382* (2013.01); *B29L 2031/3082* (2013.01)

(58) Field of Classification Search
CPC ........ B29C 43/3642; B29C 2043/3652; B29C 33/40; B29C 33/405; B29C 33/50; B29C 33/505; B29C 70/342; B29C 70/44
See application file for complete search history.

(56) References Cited

U.S. PATENT DOCUMENTS

| | | | | |
|---|---|---|---|---|
| 4,167,430 A | * | 9/1979 | Arachi | B29C 43/32 156/212 |
| 4,936,525 A | * | 6/1990 | Daffix | F42B 10/04 244/3.24 |
| 5,714,179 A | * | 2/1998 | Goodridge | B29C 33/303 249/112 |
| 6,217,000 B1 | * | 4/2001 | Younie | B29D 99/0003 249/184 |
| 7,293,737 B2 | | 11/2007 | Engwall et al. | |
| 7,357,166 B2 | | 4/2008 | Pham et al. | |
| 7,527,222 B2 | | 5/2009 | Biornstad et al. | |
| 8,157,212 B2 | | 4/2012 | Biornstad et al. | |
| 8,182,628 B2 | | 5/2012 | Biornstad et al. | |
| 8,382,037 B2 | | 2/2013 | Biornstad et al. | |
| 8,534,339 B2 | | 9/2013 | Pham et al. | |

(Continued)

*Primary Examiner* — Joseph S Del Sole
*Assistant Examiner* — Jerzi H Moreno Hernandez
(74) *Attorney, Agent, or Firm* — McDonnell Boehnen Hulbert & Berghoff LLP

(57) ABSTRACT

An example apparatus for fabrication of a co-cured composite assembly includes a layup tool body with a cavity, a thermal expansion insert inserted into the cavity of the layup tool body and a first uncured composite part of the composite assembly is positioned onto the thermal expansion insert, and a solid internal mandrel configured for insertion onto the first uncured composite part. During curing, the first uncured composite part compacts and reduces in thickness while the solid internal mandrel and the thermal expansion insert each increase in size to apply pressure to the first uncured composite part.

20 Claims, 7 Drawing Sheets

(56) References Cited

U.S. PATENT DOCUMENTS

| | | |
|---|---|---|
| 9,238,335 B2 | 1/2016 | Robins et al. |
| 9,327,467 B2 | 5/2016 | Robins et al. |
| 9,486,943 B1 | 11/2016 | Robins |
| 2010/0024964 A1* | 2/2010 | Ingram, Jr. ............ B29C 70/382 156/189 |
| 2011/0024052 A1* | 2/2011 | Martin .................... B29C 33/40 156/383 |
| 2012/0040042 A1* | 2/2012 | Guitton ................. B29C 33/405 425/468 |
| 2016/0243730 A1 | 8/2016 | Robins et al. |

* cited by examiner

BULK FACTOR COMPENSATED TOOL FOR FABRICATION OF A COMPOSITE PART

FIELD

The present disclosure generally relates to methods and equipment for fabricating composite parts and/or composite assemblies, and more particularly to, a mandrel tool used in curing composite parts that includes a thermal expansion insert that can increase in size to apply pressure to the composite part during curing.

BACKGROUND

Mandrels may be used to layup, compress and/or cure a variety of composite parts that may possess one or more curves, contours, or surface features to which the mandrel needs to conform. For example, in the aircraft industry, composite stringers or stiffeners used in a fuselage or wings may be required to conform to composite skins that may be contoured and/or have surface features such as localized ply pad-ups or drop-offs. Thus, tooling to create these shapes can be complex due to the requirements of the structure.

In a specific example, to co-cure or co-bond a composite stiffener, such as a hat or omega stringer, to the composite skin as mentioned above, the uncured composite stringer is first placed into a cavity within a layup tool. A mandrel tool is then placed inside the interior volume of the stiffener prior to placement of the composite skin. Ideally, the mandrel is caused to expand to consolidate the composite during cure to generate an appropriate pressure on the composite stringer. Then, for the mandrel to be extracted, the mandrel contracts after cure to a smaller shape to provide clearance for extraction.

In the past, mandrels have been formed from flexible materials that allow the mandrel surface to conform to part contours. However, solid mandrels may not provide uniform pressure, in the cross-section or along the length of the part, during curing. Such mandrels may also be difficult to remove from the cavity after cure. Other mandrels, such as vented bladders, can leak during curing or may not apply consistent pressure during cure, which can create variations in stringer thickness in cross-section and along length. In additional, the uncompacted volume, or "bulk", of the uncured composite stringer creates challenges in properly sizing the layup tool cavities and/or the mandrel tools to ensure quality of the cured composite part.

Accordingly, there is a need for a lightweight, flexible mandrel that readily conforms to local part contours and which may be easily handled and removed after cure without need for special equipment. There is also a need for a lightweight flexible mandrel that is easily fabricated at low cost, is durable, and produces smooth part surface finishes.

SUMMARY

In one example, an apparatus for fabrication of a co-cured composite assembly is described that comprises a layup tool body comprising a cavity, a thermal expansion insert inserted into the cavity of the layup tool body and a first uncured composite part of the composite assembly is positioned onto the thermal expansion insert, and a solid internal mandrel configured for insertion onto the first uncured composite part. During curing, the first uncured composite part compacts and reduces in thickness while the solid internal mandrel and the thermal expansion insert each increase in size to apply pressure to the first uncured composite part.

In another example, an apparatus for fabrication of a co-cured composite assembly is described that comprises a layup tool body comprising a cavity and the layup tool body comprises a material with a first coefficient of thermal expansion, a thermal expansion insert inserted into the cavity of the layup tool body and a first uncured composite part of the composite assembly is positioned onto the thermal expansion insert for fabrication of the composite assembly. The thermal expansion insert comprises a material that has a second coefficient of thermal expansion. The apparatus also comprises a solid internal mandrel configured for insertion onto the first uncured composite part, and the solid internal mandrel comprises a material that has a third coefficient of thermal expansion. The second coefficient of thermal expansion and the third coefficient of thermal expansion are greater than the first coefficient of thermal expansion.

In another example, a method of fabricating a co-cured composite assembly is described that comprises inserting a thermal expansion insert into a cavity of a layup tool body, positioning a first uncured composite part of the composite assembly onto the thermal expansion insert, inserting a solid internal mandrel onto the first uncured composite part of the composite assembly, applying a second uncured composite part to create the composite assembly, and curing the composite assembly. During curing of the composite assembly, the first uncured composite part compacts and reduces in thickness while the solid internal mandrel and the thermal expansion insert each increase in size to apply pressure to the first uncured composite part and fill a recess created by compaction of the first uncured composite part.

Features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Figure 1:
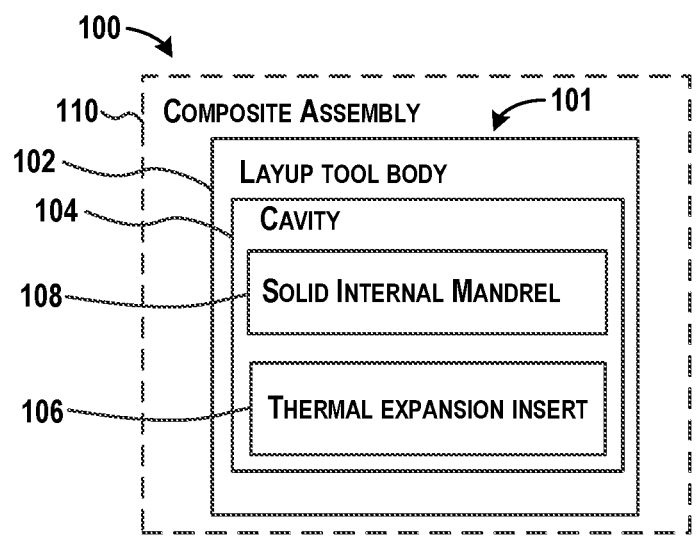
FIG. 1 illustrates a block diagram of an apparatus for fabrication of a co-cured composite assembly, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Existing internal rubber mandrels for fabrication of closed structure (hollow) composite parts may not apply a consistent pressure during cure to the composite part, which can create variations in thickness in cross section and along length of the composite part. During cure, some existing mandrels expand or contract inconsistently due in part to coefficient of thermal expansion (CTE) effects and geometric constraints, and thus, do not provide a uniform pressure to the composite part if the mandrel is not shaped and configured to an appropriate density. The mandrel may expand more in thicker areas than in thinner areas, or in instances in which the mandrel includes large holes providing internal voids for compression, such mandrels are difficult to handle and may not allow for tailoring of properties. Non-uniform expansion of a mandrel during cure causes bulging or problems with composite material around the mandrel.

Specifically, some tool design and processing for co-curing hat stiffened panels utilizes rubber mandrels and inner mold line (IML) cure tools. The stiffener is first installed in a trough/recess of the IML, tool. The mandrel is then installed in the stiffener cavity, and a skin is applied to the stiffener/tool assembly. As the stiffener debulks or compacts during cure, the tool recess may be left under-filled, which could impact final part quality.

Some mandrels have been used that are oversized, however, this can cause undulation in the uncured skin during its placement. Other processes have used bladders to maintain stiffener cavity, but these come with risk of leaks, complex bagging, or additional treatments to prevent bladder mark-off on an outside of the part.

An example layup tool includes a thermal expansion insert to line the stiffener recess. The thermal expansion insert has a material with a higher coefficient of thermal expansion (CTE) to compensate for the stiffener debulk during cure resulting in a correctly sized stiffener trough and improved stiffener quality. Example internal mandrels described herein enable forming hollow composite components that are high quality by applying consistent internal pressure during fabrication. The example layup tool, in combination with the internal mandrels, also addresses debulk of the composite stringer during cure by using material for the thermal expansion inserts in the troughs that has high thermal expansion characteristics.

During heat up in autoclave for cure, the combination of the thermal growth from stringer internal mandrel coupled with the growth from the thermal expansion insert will compact the stringer during cure. The thermal expansion insert thus provides localized compaction of the composite part during cure. Thus, using the thermal expansion insert provides additional debulk of composite material during cure. Specific examples described herein can be used for fuselage layup tools with inserts in stringer troughs to compensate for limited debulk of the uncured stringers. However, the thermal expansion insert may be used for fabrication of other composite parts as well. The thermal expansion insert may be permanently in place on the layup tool body (through an adhesive) or can be modular and placed on stringers after forming and installed into the mandrel prior to cure, for example.

Referring now to FIG. 1, a block diagram of an apparatus 100 for fabrication of a co-cured composite assembly is illustrated, according to an example implementation. The apparatus 100 includes a layup tool 101 that has a layup tool body 102 comprising a cavity 104, and a thermal expansion insert 106 inserted into the cavity 104 of the layup tool body 102. A first uncured composite part of a composite assembly 110 is positioned onto the thermal expansion insert 106. The apparatus 100 also includes a solid internal mandrel 108 configured for insertion onto the first uncured composite part of the composite assembly 110. A second uncured composite part is applied to create the composite assembly 110. During curing of the composite assembly 110, the first uncured composite part compacts and reduces in thickness while the solid internal mandrel 108 and the thermal expansion insert 106 each increase in size (due to their thermal characteristics) to apply pressure to the first uncured composite part and/or an interior of the composite assembly. For example, when the solid internal mandrel 108 and the thermal expansion insert 106 increase in size, they will fill a recess created by compaction of the first uncured composite part.

The layup tool body 102 may thus be used for processing a composite part with integral elements such as stringers. The integral elements include uncured fiber reinforced polymer resin, unidirectional sheets or plies woven together. In practice, multiple plies of fiber reinforced polymer plies may be pre-formed and positioned in the layup tool body 102 to form the stringer into a desired part shape. The composite assembly 110, including the stringer, may partially or fully surround the solid internal mandrel 108 such that the solid internal mandrel 108 is at least substantially enclosed by the composite assembly 110. Within some examples, the solid internal mandrel 108 includes an elongated mandrel body. The elongated mandrel body is useful for creating a size and shape as needed for a part, such as a stringer.

The thermal expansion insert 106 can be bonded into the cavity 104 of the layup tool body 102, such as with an adhesive, for permanent or temporary bonding. The thermal expansion insert 106 can be replaced after a number of cycles (e.g., 20-50 cycles).

The thermal expansion insert 106 and the solid internal mandrel 108 may be composed of an elastomeric material, and thus, the thermal expansion insert 106 may be an elastomeric thermal expansion insert and the solid internal mandrel 108 may be an elastomeric internal mandrel. The elastomeric material may include various materials, and thus, the thermal expansion insert 106 and the solid internal mandrel 108 may be formed from, for example, without limitation, a rubber material, a composite material, a silicone material, a fluoropolymer elastomer, and other combinations of materials. The elastomeric material may also include materials such as Teflon® (E.I. du Pont de Nemours and Company) coated silicone or hard rubber, and may be pliable to enable the elastomeric material to conform to various configurations. The elastomeric material may also include Viton™ or butyl rubber, as additional examples.

The thermal expansion insert 106 and the solid internal mandrel 108 may be a solid elastomer body, and may vary in density or thermal/mechanical properties. In one example, different mechanical properties can include density and stiffness, and materials for the thermal expansion insert 106 and the solid internal mandrel 108 can be chosen as having specific properties. Thus, the thermal expansion insert 106 and the solid internal mandrel 108 may be dual density components. Selection of materials to use for the thermal expansion insert 106 and the solid internal mandrel 108 can be made to balance stiffness and coefficient of thermal expansion (CTE) effects during cure. An optimization of pressure distribution can be determined by using different or similar materials for the thermal expansion insert 106 and the solid internal mandrel 108, for instance.

In some examples, materials of the thermal expansion insert 106 and the solid internal mandrel 108 may include different densities to enable the thermal expansion insert 106 and the solid internal mandrel 108 to expand and compress differently for distribution of pressure. To create materials for use in the thermal expansion insert 106 and the solid internal mandrel 108 having different mechanical properties (such as different densities), hollow micro-particles can be embedded within the materials that are used for the thermal expansion insert 106 and the solid internal mandrel 108. A different distribution of hollow-microparticles can be used in different areas of the thermal expansion insert 106 and the solid internal mandrel 108 to create segments having different densities, and thus, different mechanical properties.

In one example, the layup tool body 102 comprises a material with a CTE substantially similar to a CTE of a material of the composite part or composite assembly 110. In this manner, the layup tool body 102 and the composite assembly 110 will respond to the thermal conditions during cure in a similar manner. The CTE describes a change in size of a material in response to a change in temperature, which includes changes in length compared to original length (linear expansion), changes in area compared to original area (areal expansion), and/or changes in volume compared to original volume (volumetric expansion). Specifically, the CTE is the ratio of the change in size of a material to its change in temperature. A substantially similar CTE can be the same CTE, or within a tolerance of +/−10%, for example.

The thermal expansion insert 106 can comprise a material that has a CTE greater than a CTE of a material of the composite part or composite assembly 110, such that during cure, the thermal expansion insert 106 may expand as the composite assembly debulks. Similarly, the solid internal mandrel 108 may comprise a material that has a CTE that is substantially similar to a CTE of a material of the thermal expansion insert 106 so that the solid internal mandrel 108 also expands during cure. As a result, as the parts of the composite assembly 110 debulk during cure (reduce in gauge or thickness), the thermal expansion insert 106 and the solid internal mandrel 108 (which have higher CTE) expand or grow during cure in an amount sufficient in size to substantially match an amount that the composite part debulks. Without the thermal expansion insert, the solid internal mandrel 108 may expand less than the composite part reduces in thickness resulting in the cavity 104 being under-filled and possibly impacting final part quality.

Thus, within one example, the layup tool body 102 comprises a material with a first CTE, the thermal expansion insert 106 comprises a material that has a second CTE, the solid internal mandrel 108 comprises a material that has a third CTE, and the second CTE and the third CTE are greater than the first CTE. In one example, materials for the second CTE and the third CTE are up to about twice the CTE of the first CTE.

Figure 2:
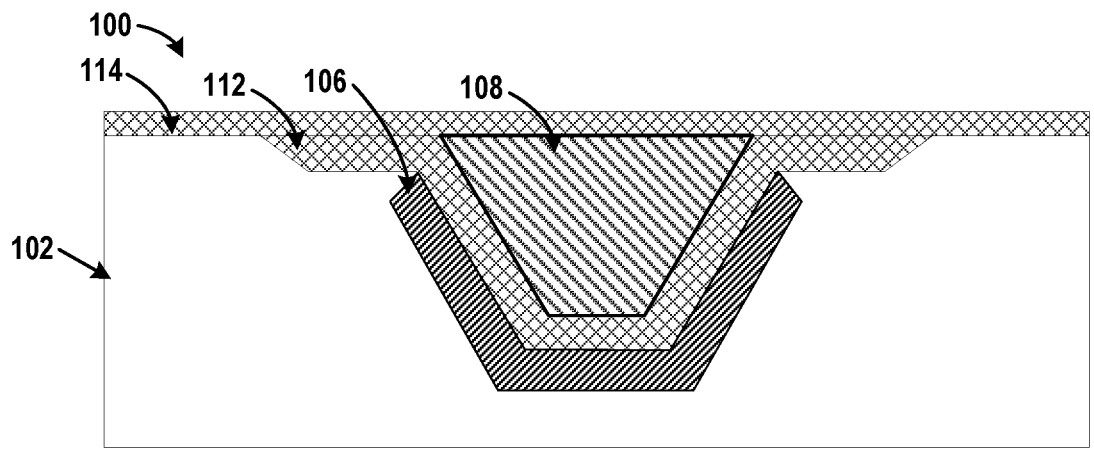
FIG. 2 illustrates a side view of the apparatus, according to an example implementation.

FIG. 2 illustrates a side view of the apparatus 100, according to an example implementation. The thermal expansion insert 106 is inserted into the layup tool body 102, followed by a first uncured composite part 112 of the composite assembly 110. The first uncured composite part 112 is an uncured composite part to form a contoured stringer. The first uncured composite part 112 can thus include a laminate comprising a plurality of uncured fiber reinforced polymer resin plies or otherwise includes an uncured composite material with an initial volume or "bulk" that needs to be compensated for with the thermal expansion insert 106 during cure. The first uncured composite part 112 may also include a 3D woven composite that includes bulk. The solid internal mandrel 108 is then inserted onto the first uncured composite part 112, and a second uncured composite part 114 is applied to create the composite assembly 110. The second uncured composite part 114 may include a skin (which may be composed of the same materials as the first uncured composite part 112).

FIG. 2 illustrates a configuration of the apparatus 100 at room temperature or ambient conditions with the composite assembly 110 in an uncured state. At ambient conditions, a volume of the cavity 104 is filled to match outer surface of the layup tool body 102. When the second uncured composite part 114 is applied (e.g., with an advanced fiber placement (AFP) machine or by other lamination process) to the outer surface of the layup tool body 102, the second uncured composite part 114 can be applied over the solid internal mandrel 108 without material distortion. With the thermal expansion insert 106 and the solid internal mandrel 108 in position prior cure, they can also properly react to the applied pressure of the compaction roller of AFP machine during lamination of the second uncured composite part 114 (e.g., skin), further ensuring that material distortion is minimized.

Figure 3:
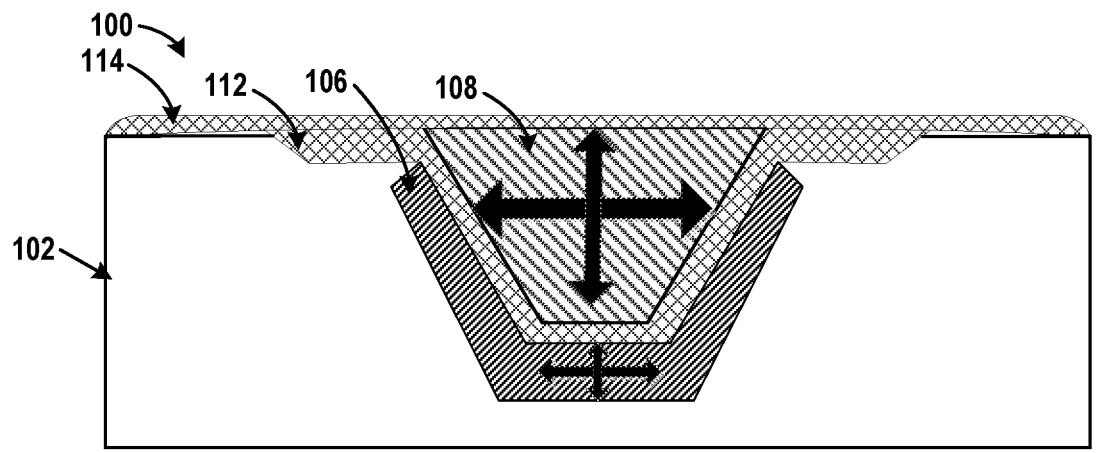
FIG. 3 illustrates a side view of the apparatus during curing, according to an example implementation.

FIG. 3 illustrates a side view of the apparatus 100 at a stage during curing, according to an example implementation. In FIG. 3, the solid internal mandrel 108 and the thermal expansion insert 106 each expand in size and apply pressure against the first uncured composite part 112 and the second uncured composite part 114. In an example, a 20% expansion may be experienced by the thermal expansion insert 106 and the solid internal mandrel 108 at a cure temperature of 360° F. This enables the thermal expansion insert 106 and the solid internal mandrel 108 to expand and fill area available due to the compaction of the first uncured composite part 112 (e.g., created by compaction of the bulk in the first uncured composite part 112).

Thus, as the composite assembly 110 is heated and cured (including simultaneous or "co-curing" of the first uncured composite part 112 and the second uncured composite part 114), the first uncured composite part 112 debulks and reduces in thickness, and the thermal expansion insert 106 and the solid internal mandrel 108 grow, in response to the increase in temperature, to fill the space available due to the compaction of the first uncured composite part 112. If the solid internal mandrel 108 alone were simply sized to compensate for the debulked volume of the first uncured composite part 112 without use of the thermal expansion insert 106, the solid internal mandrel 108 may overfill the cavity 104 of the layup tool body 102. The oversized internal mandrel could impose skin undulations or other artifacts on the skin surface. By using the thermal expansion insert 106 on a side of the first uncured composite part 112 opposite placement of the solid internal mandrel 108, both of the thermal expansion insert 106 and the solid internal mandrel 108 together expand in size during cure to fill the space created by debulking of the first uncured composite part 112, thus enabling a higher quality composite part to be fabricated.

Figure 4:
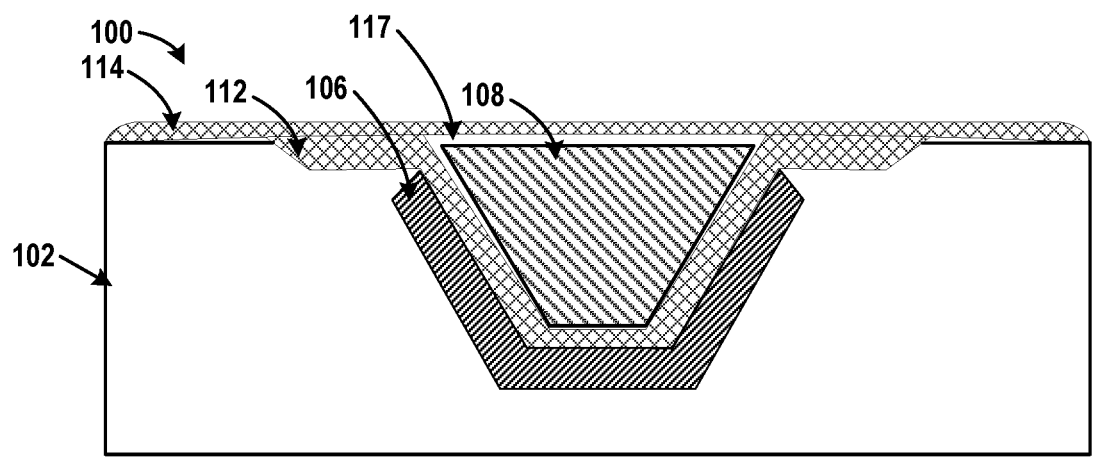
FIG. 4 illustrates a side view of the apparatus 100 after cure, according to an example implementation.

FIG. 4 illustrates a side view of the apparatus 100 after cure, according to an example implementation. For the solid internal mandrel 108 to be extracted, it will contract down after cure to its original size (after cooling, for example to room temperature) to provide clearance for extraction and to be withdrawn from the composite assembly 110 after the part layup is compacted and cured. As shown in FIG. 4, after cure, the first uncured composite part 112 and the second uncured composite part 114 are completely compacted, and a gap 117 now exists in the cavity 104 so that the solid internal mandrel 108 can be removed.

Within examples, the curing environment includes a change in temperature, and thus, the thermal expansion insert 106 and the solid internal mandrel 108 expand based on a threshold temperature applied to the composite assembly 110. An example threshold temperature may be within a range of about 200° F. to 400° F. Other threshold temperatures may be applicable as well based on the type of the fiber reinforced polymer resin material is used, such as within a range of about 100° F. to 200° F., a range of about 150° F. to 300° F., a range of about 250° F. to 350° F., etc.

By lining the cavity 104 of the layup tool body 102 with the thermal expansion insert 106 that has a material with higher CTE than the first uncured composite part 112, during cure, the thermal expansion insert 106 expands and applies pressure on the first uncured composite part 112, so that growth of the thermal expansion insert 106 expands toward the first uncured composite part 112 as the first uncured composite part 112 debulks and reduces in thickness, and the solid internal mandrel 108 expands. The size of the thermal expansion insert 106 and the solid internal mandrel 108 can be appropriately tailored for thickness growth as needed (based on temperature at cure). Then, the localized growth of each fills the space created by the debulking of the first uncured composite part 112 during cure.

Figure 14:
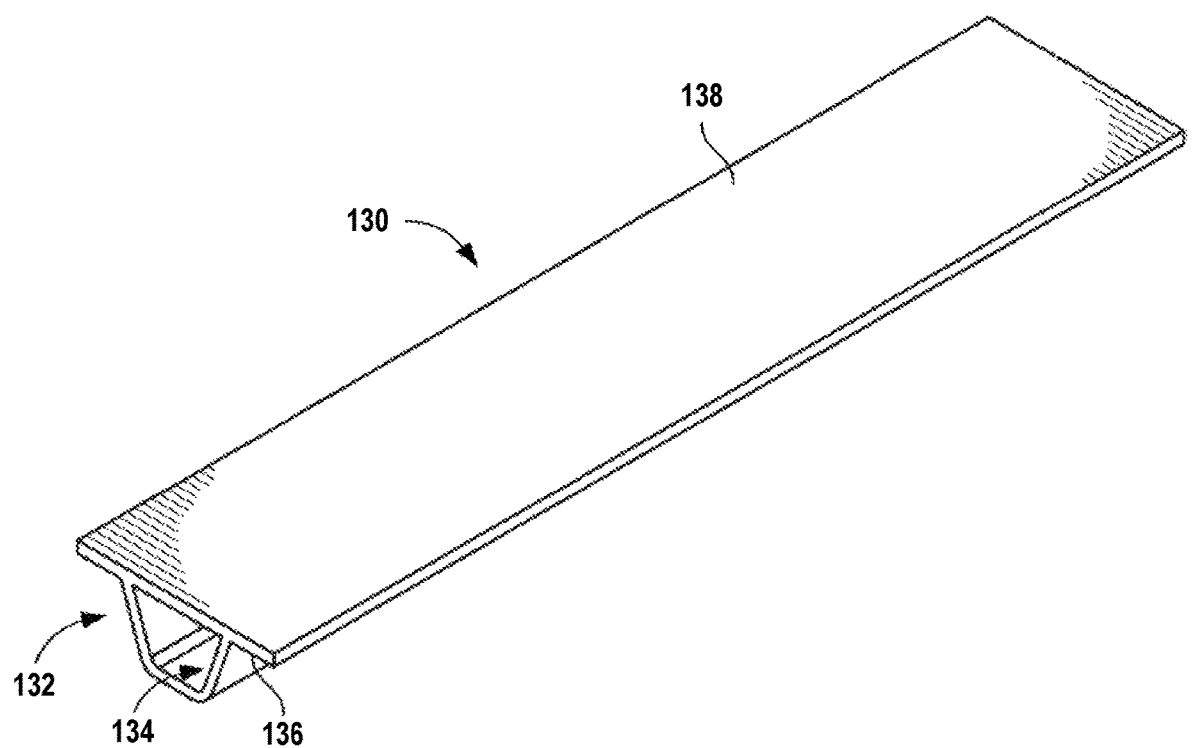
FIG. 14 illustrates an example of a stringer (e.g., composite resin part) having an internal cavity by which the assembly may be used for fabrication, according to an example implementation.

The composite assembly 110 may be cured to form any of a variety of composite components, structures, or parts that form full or partial enclosures having uniform or non-uniform cross sections along their lengths. For example, the cured part may comprise an integrally stiffened skin. As another example, the cured part may comprise a duct (not shown) or a conduit (not shown) used to transport fluids, such as, for example and without limitation, air ducts and fuel lines used in a wide variety of applications, including vehicles. An example of a composite component that may benefit from use of the apparatus 100 is illustrated in FIG. 14 (described below).

Figure 5:
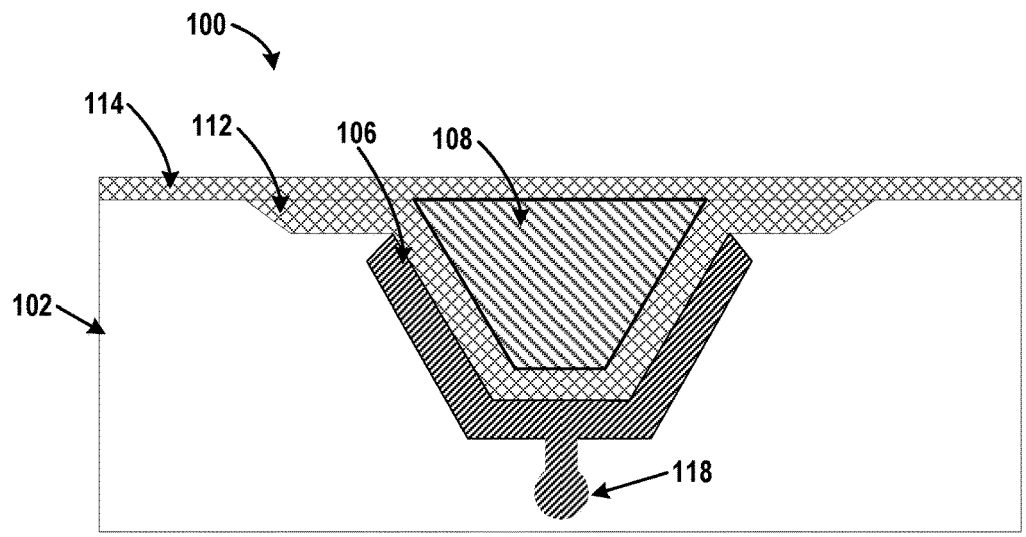
FIG. 5 illustrates a side view of the apparatus, according to another example implementation.

FIG. 5 illustrates a side view of the apparatus 100, according to another example implementation. In FIG. 5, the thermal expansion insert 106 is shown to include an attachment element 118 enabling a mechanical attachment into the cavity 104 of the layup tool body 102. The attachment element 118 can be a snap-fit/press-in liner attachment feature where a male feature is on the thermal expansion insert 106 and a female feature is included in the cavity 104 on the layup tool body 102 (or vice versa).

The attachment element 118 may be used in addition to or rather than adhesively bonding the thermal expansion insert 106 to the layup tool body 102.

Figure 6:
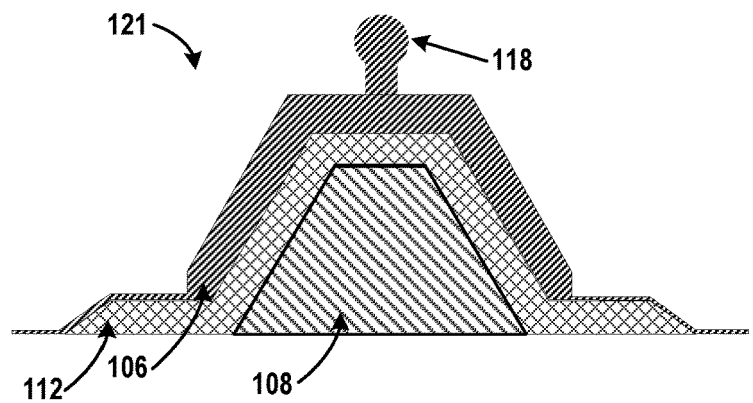
FIG. 6 illustrates a side view of a package, according to an example implementation.

FIG. 6 illustrates a side view of a package 121, according to an example implementation. In one example, the first uncured composite part 112 is positioned on the solid internal mandrel 108 onto which the thermal expansion insert 106 is then placed. Together, the solid internal mandrel 108, the first uncured composite part 112, and the thermal expansion insert 106 comprise the package 121. The package 121 can be located for placement into the layup tool body 102 using the attachment element 118 of the thermal expansion insert 106, for example. In one example, the package 121 may comprise a stringer package.

Figure 7:
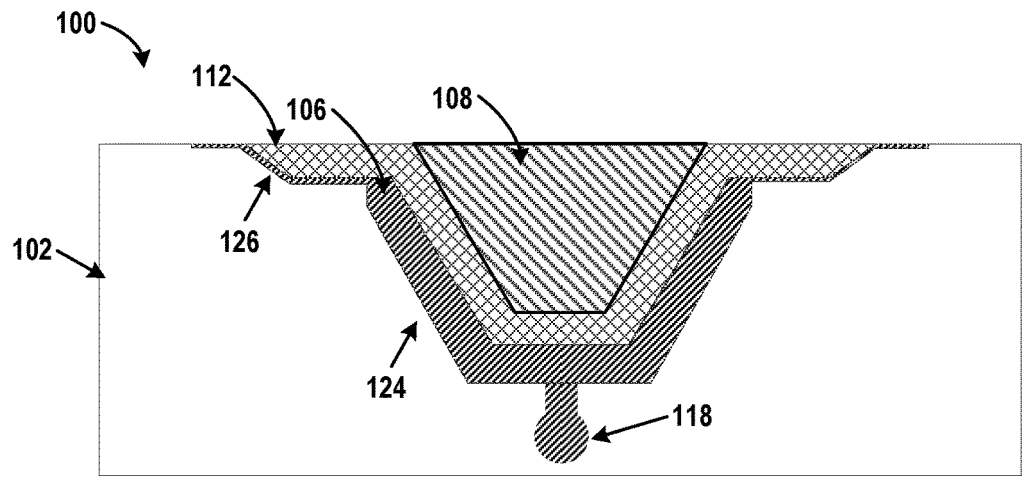
FIG. 7 illustrates a side view of the apparatus, according to another example implementation.
Figure 8:
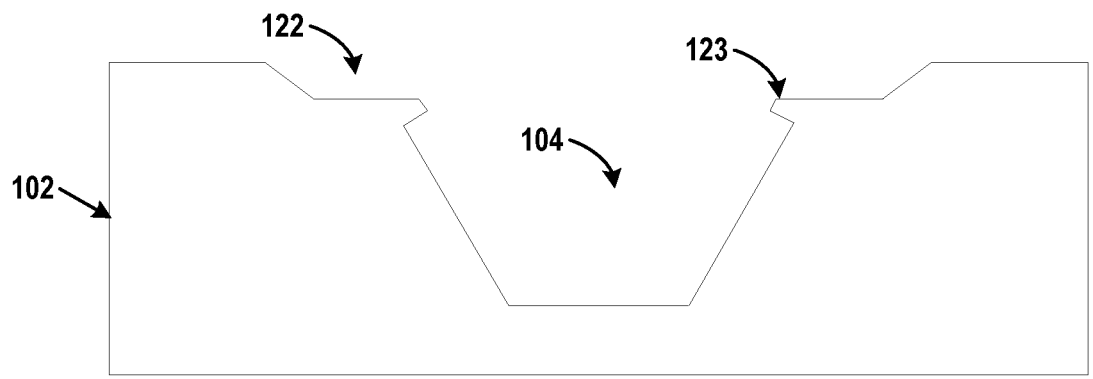
FIG. 8 illustrates a side view of the layup tool body that includes the cavity, according to an example implementation.

FIG. 7 illustrates a side view of the apparatus 100, according to another example implementation. In FIG. 7, the layup tool body 102 further includes depressions 122 (e.g., as shown in FIG. 8) on either side of the cavity 104, which may, for example, correspond to a flange portion of a composite hat stringer. The thermal expansion insert 106 comprises a central portion 124 and extensions 126 coupled to the central portion 124 that extend into the depressions 122 of the layup tool body 102. The extensions 126 have a thickness less than a thickness of the central portion 124. Thus, the thermal expansion insert 106 becomes thinner at stringer flange locations where there may be less of a requirement for CTE compression of the extensions 126 during cure.

As shown in FIGS. 6-7, the thermal expansion insert 106 and the extensions 126 together enclose the outermost surface of the first uncured composite part 112 of the package 121. Therefore, the thermal expansion insert 106 and the extensions 126 can act as a liner, bag, or protective film for storage of the package 121 prior to installation and cure. Then, the package 121 can be picked up to locate the package 121 into the layup tool body 102 for proper stringer location and accuracy of placement within the layup tool body 102.

FIGS. 8-13 illustrate an example process flow for fabrication of the composite part, according to an example implementation. The illustrations in FIGS. 8-13 illustrate side cross-sectional views of elements used in the fabrication of the composite part.

Initially, as shown in FIG. 8, the layup tool body 102 is shown that includes the cavity 104. The cavity 104 is shaped and sized according to a hollow cavity as desired for the composite part. In FIG. 8, the cavity 104 includes lips, such as lip 123, that define an area/volume or recess in the cavity 104 for the thermal expansion insert 106 to be positioned, for example. However, the lip 123 may be optional as well, and the thermal expansion insert 106 can be positioned as a layer of material in the cavity 104.

Figure 9:
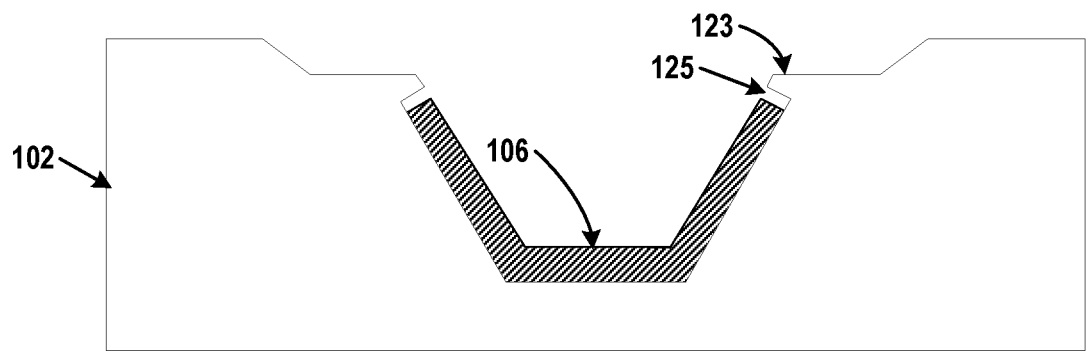
FIG. 9 illustrates a side view of the thermal expansion insert inserted into the cavity of the layup tool body, according to an example implementation.

Next, as shown in FIG. 9, the thermal expansion insert 106 is inserted into the cavity 104 of the layup tool body 102. The thermal expansion insert 106 may be adhesively bonded to the cavity 104, however, bonding may not be required for every cure cycle as the thermal expansion insert 106 may remain stay in place for a plurality of cure cycles before being removed and replaced.

In addition, in FIG. 9, the thermal expansion insert 106 is shown to be sized so as not to fill an entire area of the recess in the cavity 104 defined by the lip 123. An expansion gap 125 will then be present on either side of the thermal expansion insert 106 between the thermal expansion insert 106 and the lip 123. There may be some linear expansion of the thermal expansion insert 106 during curing, and thus, the expansion gap 125 provides space for the linear expansion away from the first uncured composite part 112 so as to minimize any fiber distortion or other surface anomaly that could occur in the first uncured composite part 112, for example. The expansion gap 125 is shown in FIG. 9 with a defined geometry but it can be appreciated that a range of suitable geometries are be possible. The expansion gap 125 may be optional, however, and the thermal expansion insert 106 may be sized to substantially fill the recess in the cavity 104 in other examples. Still further, ends of the thermal expansion insert 106 may be tapered or shaped differently than as shown in FIG. 9. Tapering of the ends of the thermal expansion insert 106 can provide further support to the first uncured composite part 112 during curing, for example.

Figure 10:
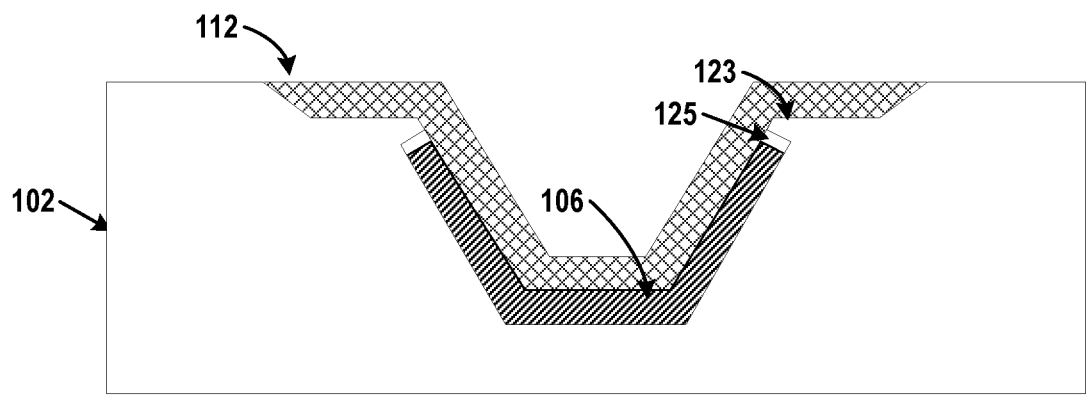
FIG. 10 illustrates a side view of the first uncured composite part of the composite assembly positioned onto the thermal expansion insert, according to an example implementation.
Figure 11:
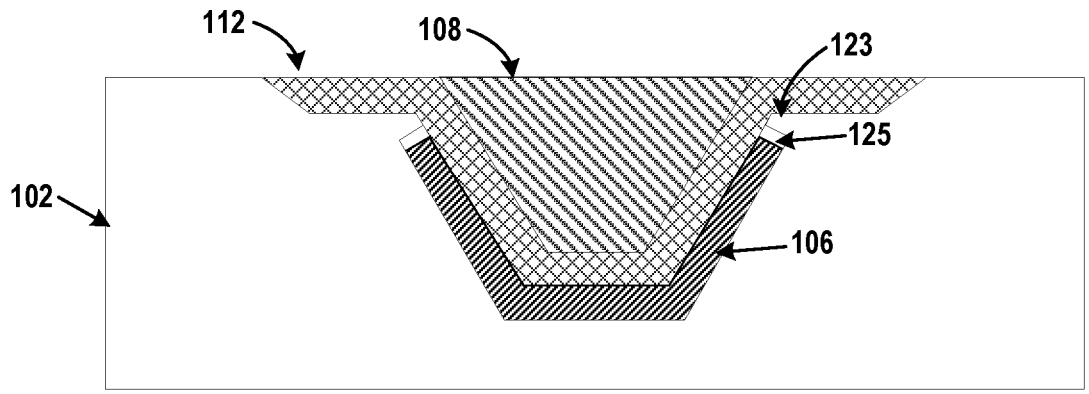
FIG. 11 illustrates a side view of the internal mandrel inserted onto the first uncured composite part of the composite assembly, according to an example implementation.
Figure 12:
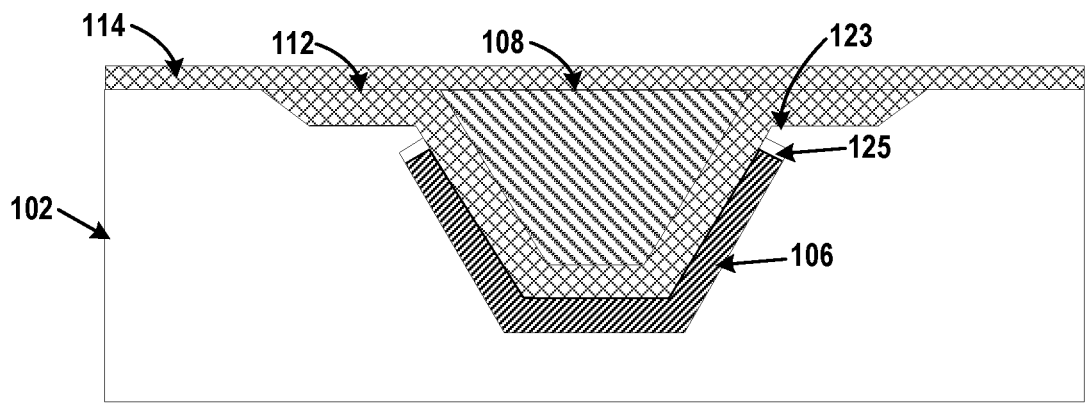
FIG. 12 illustrates a side view of the second uncured composite part applied to create the composite assembly, according to an example implementation.
Figure 13:
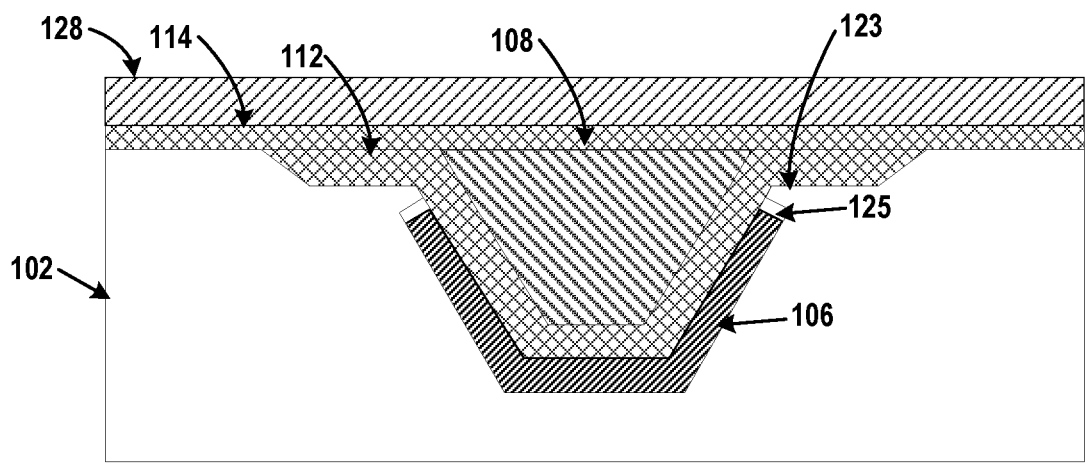
FIG. 13 illustrates a side view of the assembly enclosed in a vacuum bag, and the first uncured composite part and the second uncured composite part are co-cured, according to an example implementation.

Following, as shown in FIG. 10, the first uncured composite part 112 of the composite assembly 110 is positioned onto the thermal expansion insert 106. As shown in FIG. 11, the solid internal mandrel 108 is then inserted onto the first uncured composite part 112 of the composite assembly 110. As shown in FIG. 12, the second uncured composite part 114 is applied to create the composite assembly 110. As shown in FIG. 13, the composite assembly 110 is enclosed in a vacuum bag 128, and the first uncured composite part 112 and the second uncured composite part 114 is ready to be co-cured. During curing, the first uncured composite part 112 compacts and reduces in thickness while the solid internal mandrel 108 and the thermal expansion insert 106 each increase in thickness to apply pressure to the first uncured composite part 112 and fill a recess created by compaction of the first uncured composite part 112 (differences and changes in thickness and size of the solid internal mandrel 108, the thermal expansion insert 106, the first uncured composite part 112, and the second uncured composite part 114 during curing are not shown in FIG. 13).

Following curing, the solid internal mandrel 108 is removed from the cavity 104 of the layup tool body 102. FIG. 4 illustrates an example of the apparatus 100 after cure showing dimensional changes that have occurred, for example.

The thermal expansion insert 106 and the solid internal mandrel 108 thus apply pressure to the first uncured composite part 112 and the second uncured composite part 114 during layup and curing so as to form a hat stiffener. The solid internal mandrel 108 defines and maintains a shape of the interior of the hat stiffener during curing, with substantially even pressure and without substantial distortion. As shown, the solid internal mandrel 108 has a substantially trapezoidal cross sectional shape, generally matching that of the interior of the hat stiffener. However, the solid internal mandrel 108 may possess any of a variety of cross sectional shapes depending on an application and a particular shape of the composite structure layup. The solid internal mandrel 108 also includes a generally solid body that extends a length of the hat stiffener.

In an example use case, the thermal expansion insert 106 and the solid internal mandrel 108 may be used for curing composite hat stiffeners for an aircraft. Hat stiffeners are commonly used in composite structures, and tooling to create these shapes can be complex due to requirements of the structure. To co-cure or co-bond the hat stiffener to a skin, the solid internal mandrel 108 is placed inside a cavity of the hat stiffener. The solid internal mandrel 108 generally expands to consolidate the composite laminate during cure to generate an appropriate pressure on the laminate. Then, the solid internal mandrel 108 contracts down after cure to its original shape to provide clearance for extraction.

Thus, during cure, the thermal expansion insert 106 and the solid internal mandrel 108 provide an even pressure distribution across the hat/skin cross section, and pressure generated by the thermal expansion insert 106 and the solid internal mandrel 108 substantially matches external pressure of a processing environment in which the part is curing (e.g., autoclave pressure, ambient pressure, etc.). After cure, the solid internal mandrel 108 returns to its original size. Due to the compaction of the hat stiffener during cure, the internal mandrel may now be removed.

FIG. 14 illustrates an example of a stringer 130 (e.g., fiber reinforced polymer resin composite part) having an internal cavity by which the apparatus 100 may be used for fabrication, according to an example implementation. For example, and without limitation, the apparatus 100 and curing method may be used in fabrication of a fiber reinforced composite resin stringer as shown in FIG. 14. In one arrangement, the stringer 130 may comprise a multi-ply layup of materials. In the illustrated arrangement, the stringer 130 comprises a hat section 132 forming an internal stringer cavity 134, a pair of laterally extending flange sections 136, and a substantially flat skin section 138 that is consolidated together with the laterally extending flange sections 136 during curing. As those of ordinary skill in the art will recognize, alternative stringer geometries are possible.

The stringer 130 may be fabricated using the thermal expansion insert 106 and the solid internal mandrel 108, as described in FIGS. 1-13. After curing, the composite assembly 110 of FIG. 1 forms the stringer 130. The solid internal mandrel 108 fills the internal stringer cavity 134 that is a hollow trapezoidal space.

Example composite material used for the stringer 130 may be generally a lightweight material, such as an uncured reinforcing tape or fabric that, when laminated with a plurality of plies, includes bulk. The tape or fabric can include a plurality of fibers such as graphite fibers that are embedded within a matrix material, such as a polymer, e.g., an epoxy or phenolic. The tape or fabric could be unidirectional or woven depending on a degree of reinforcement desired. Thus, the plurality of plies of prepreg tape or fabric is laid into the cavity 104 of the layup tool body 102 to pre-form the tape or fabric into a desired shape of the stringer 130. Alternatively, the plurality of plies of prepreg tape or fabric may be formed into a desired shape prior to installation into the cavity 104 of the layup tool body 102. After installation of the solid internal mandrel 108, addition plies of prepreg tape or fabric are placed on the layup tool to form the substantially flat skin section 138. The stringer 130 could be any suitable dimension to provide various degrees of reinforcement, and could comprise any number of plies of prepreg tape or fabric.

The thermal expansion insert 106 and the solid internal mandrel 108 enable fabrication of high quality stringers by applying consistent internal pressure during fabrication. In addition, the thermal expansion insert 106 and the solid internal mandrel 108 are also useful, as shown in FIG. 6, to create the package 121. The thermal expansion insert 106 and extensions 126 together can act as a protection film for storage prior to cure and for transfer and placement of the package 121 into the layup tool body 102.

Within the examples described above, the thermal expansion insert 106 and the solid internal mandrel 108 provide for improved fabrication of closed composite structures (such as hat stringers) due to the thermal expansion insert 106 and the solid internal mandrel 108 expanding to fill space created during debulking of the first uncured composite part 112. The thermal expansion insert 106 and the solid internal mandrel 108 can also be used in other applications for fabrication of other types of composite structures.

Figure 15:
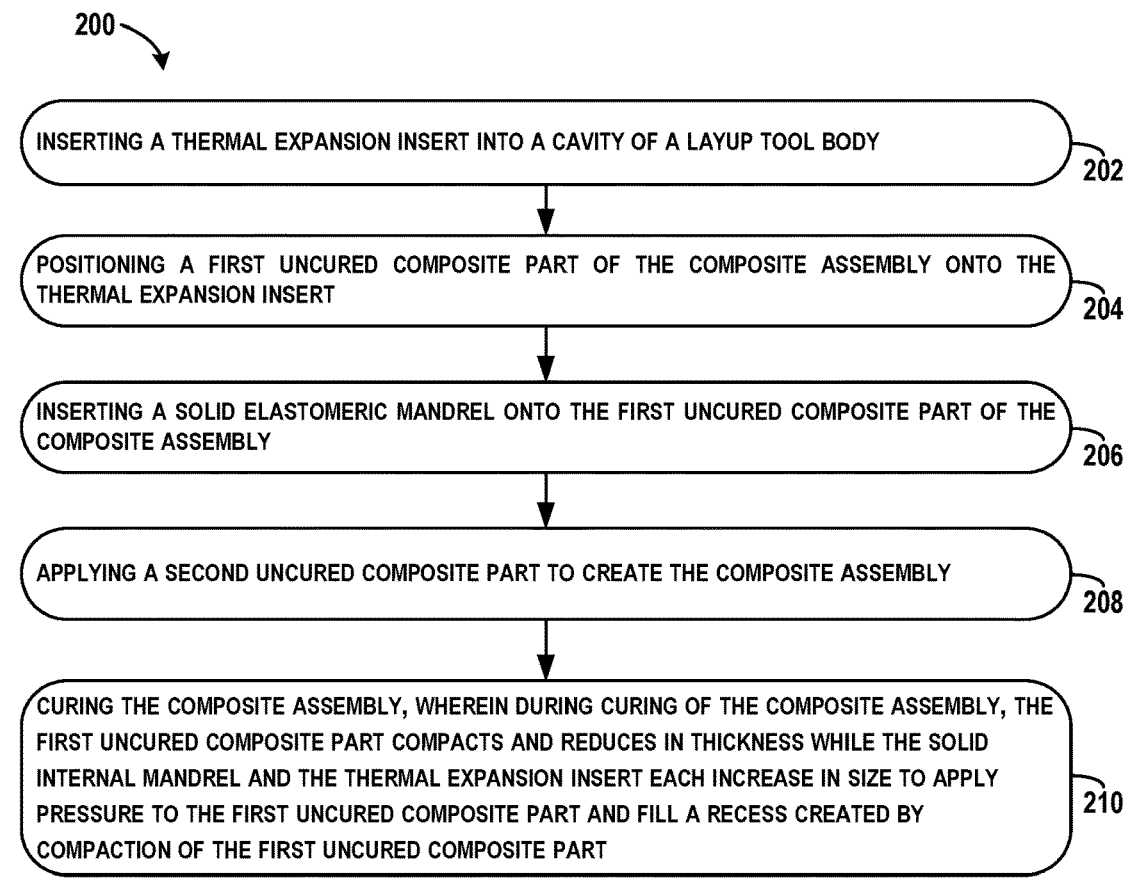
FIG. 15 shows a flowchart of an example of a method of fabricating a co-cured composite assembly, according to an example implementation.

FIG. 15 shows a flowchart of an example of a method 200 of fabricating a co-cured composite assembly (e.g., such as the stringer 146), according to an example implementation. Method 200 shown in FIG. 15 presents an example of a method that, for example, could be used with the apparatus 100 shown in FIG. 1, for example, and may be performed with components illustrated in FIG. 1. In some examples, components may be arranged to be adapted to, capable of, or suited for performing the functions, such as when operated in a specific manner. Method 200 may include one or more operations, functions, or actions as illustrated by one or more of blocks 202-210. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes inserting the thermal expansion insert 106 into the cavity 104 of the layup tool body 102. At block 204, the method 200 includes positioning the first uncured composite part 112 of the composite assembly 110 onto the thermal expansion insert 106. At block 206, the method 200 includes inserting the solid internal mandrel 108 onto the first uncured composite part 112 of the composite assembly 110. At block 208, the method 200 includes applying the second uncured composite part 114 to create the composite assembly 110. At block 210, the method 200 includes curing the composite assembly 110. During curing of the composite assembly 110, the first uncured composite part 112 compacts and reduces in thickness while the solid internal mandrel 108 and the thermal expansion insert 106 each increase in size to apply pressure to the first uncured composite part 112 and fill a recess created by compaction of the first uncured composite part 112.

Figure 16:
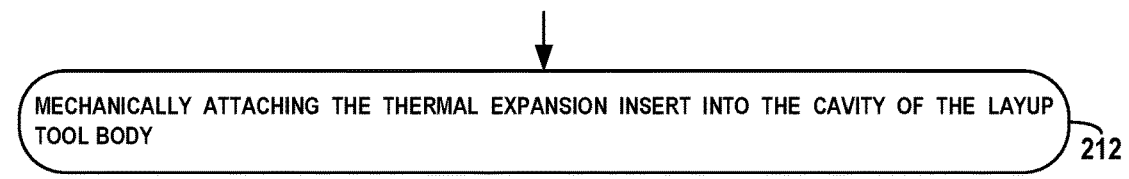
FIG. 16 shows a flowchart of an example method for use with the method shown in FIG. 15, according to an example implementation.

FIG. 16 shows a flowchart of an example method for use with the method 200 shown in FIG. 15, according to an example implementation. At block 212, functions include mechanically attaching the thermal expansion insert 106 into the cavity 104 of the layup tool body 102. For example, the thermal expansion insert 106 can be mechanically attached using the attachment element 118.

Figure 17:
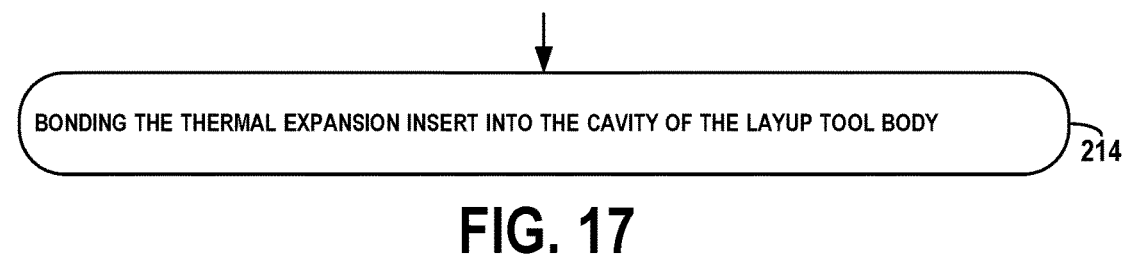
FIG. 17 shows a flowchart of another example method for use with the method shown in FIG. 15, according to an example implementation.

FIG. 17 shows a flowchart of another example method for use with the method 200 shown in FIG. 15, according to an example implementation. At block 214, functions include bonding the thermal expansion insert 106 into the cavity 104 of the layup tool body 102.

Figure 18:
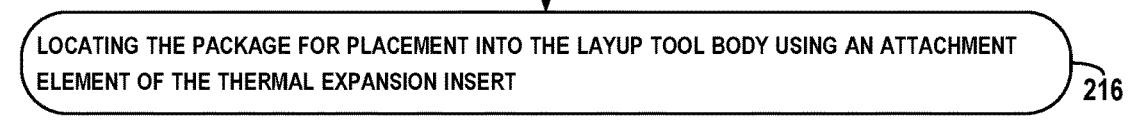
FIG. 18 shows a flowchart of another example method for use with the method shown in FIG. 15, according to an example implementation.

FIG. 18 shows a flowchart of another example method for use with the method 200 shown in FIG. 15, according to an example implementation. At block 216, functions include locating the package 121 for placement into the layup tool body 102 using the attachment element 118 of the thermal expansion insert 106. In some examples, the positioning step (e.g., shown at block 204) and the inserting step (e.g., shown at block 206) combine to carry-out the locating step (e.g., shown at block 216).

Example mandrels described herein can provide consistent and uniform pressure for curing of composite stiffeners in inline mode line (IML) tooling applied across a non-uniform cross section of the part, which improves existing part fabrication processes. For example, when using mandrels for curing of hat stiffeners in IML, tooling, pressure exerted by thermal expansion of the mandrel needs to be uniformly distributed regardless of the shape of the mandrel. If pressure is not evenly distributed, the resulting composite part will have unacceptable thickness variations (consolidation) that result from too much pressure in some areas and not enough pressure in other areas. Using the mandrel described herein, a unique geometry can be chosen for the mandrel as required by the composite part being fabricated, and pressure can be distributed due to the mandrel comprising multiple segments.

The apparatus 100 may be used for fabricating composite co-cured stiffened panels, such as used within vehicles in the aerospace and automotive industries, to compensate for localized bulk of prepreg in the panels prior to cure enabling improved part quality and reducing rework hours. Thus, high quality parts can be created by ensuring adequate debulking of prepreg during cure.

As used herein, by the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), apparatus(es), and method(s) disclosed herein include a variety of components, features, and functionalities. It should be understood that the various examples of the system(s), apparatus(es), and method(s) disclosed herein may include any of the components, features, and functionalities of any of the other examples of the system(s), apparatus(es), and method(s) disclosed herein in any combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. An apparatus for fabrication of a co-cured composite assembly, the apparatus comprising:
a layup tool body, comprising a cavity, which comprises lips that define a recess;
a thermal expansion insert, located in the cavity of the layup tool body and positioned in the recess, defined by the lips of the cavity;
an expansion gap, located on either side of the thermal expansion insert between the thermal expansion insert and the lips of the cavity; and
a solid internal mandrel, configured for insertion into the cavity,
wherein each of the solid internal mandrel and the thermal expansion insert increases in size when exposed to at least one of heat or pressure.

2. The apparatus of claim 1, wherein the solid internal mandrel is an elastomeric internal mandrel.

3. The apparatus of claim 1, wherein the thermal expansion insert is an elastomeric thermal expansion insert.

4. The apparatus of claim 1, wherein the layup tool body further comprises a material with a coefficient of thermal expansion substantially similar to a coefficient of thermal expansion of a material of the co-cured composite assembly.

5. The apparatus of claim 1, wherein the thermal expansion insert comprises a material that has a coefficient of thermal expansion greater than a coefficient of thermal expansion of a material of the co-cured composite assembly.

6. The apparatus of claim 1, wherein the solid internal mandrel comprises a material that has a coefficient of thermal expansion that is substantially similar to a coefficient of thermal expansion of a material of the thermal expansion insert.

7. The apparatus of claim 1, wherein: the layup tool body comprises a material with a first coefficient of thermal expansion;
the thermal expansion insert comprises a material that has a second coefficient of thermal expansion;
the solid internal mandrel comprises a material that has a third coefficient of thermal expansion; and
the second coefficient of thermal expansion and the third coefficient of thermal expansion are greater than the first coefficient of thermal expansion.

8. The apparatus of claim 1, wherein the thermal expansion insert comprises an attachment element, enabling a mechanical attachment into the cavity of the layup tool body.

9. The apparatus of claim 1, wherein the thermal expansion insert is bonded into the cavity of the layup tool body.

10. The apparatus of claim 1, wherein:
the layup tool body further comprises depressions on either side of the cavity,
the thermal expansion insert comprises a central portion and extensions, coupled to the central portion,
the extensions extend into the depressions of the layup tool body, and
the extensions have a thickness that is smaller than a thickness of the central portion.

11. An apparatus for fabrication of a co-cured composite assembly, the apparatus comprising:
a layup tool body, comprising a cavity, which comprises lips that define a recess, wherein the layup tool body comprises a material with a first coefficient of thermal expansion;
a thermal expansion insert, located in the cavity of the layup tool body and positioned in the recess, defined by the lips of the cavity;
an expansion gap, located on either side of the thermal expansion insert between the thermal expansion insert and the lips, wherein the thermal expansion insert comprises a material that has a second coefficient of thermal expansion; and
a solid internal mandrel, configured for insertion into the cavity, wherein the solid internal mandrel comprises a material that has a third coefficient of thermal expansion,
wherein the second coefficient of thermal expansion and the third coefficient of thermal expansion are greater than the first coefficient of thermal expansion.

12. The apparatus of claim 11, wherein the first coefficient of thermal expansion is substantially similar to a coefficient of thermal expansion of a material of the co-cured composite assembly.

13. The apparatus of claim 11, wherein the second coefficient of thermal expansion is substantially similar to and the third coefficient of thermal expansion.

14. The apparatus of claim 11, wherein the thermal expansion insert further comprises an attachment element enabling a mechanical attachment into the cavity of the layup tool body.

15. The apparatus of claim 11, wherein the thermal expansion insert is bonded into the cavity of the layup tool body.

16. The apparatus of claim 11, wherein: the layup tool body further comprises depressions on either side of the cavity, the thermal expansion insert comprises a central portion and extensions, coupled to the central portion, the extensions extend into the depressions of the layup tool body, and the extensions have a thickness that is smaller than a thickness of the central portion.

17. A method of fabricating a co-cured composite assembly, the method comprising:
inserting a thermal expansion insert into a cavity of a layup tool body and positioning the thermal expansion insert in a recess, defined by lips of the cavity, wherein an expansion gap is present on either side of the thermal expansion insert between the thermal expansion insert and the lips;
positioning a first uncured composite part onto the thermal expansion insert;
inserting a solid internal mandrel onto the first uncured composite part;
applying a second uncured composite part to the solid internal mandrel to create a composite assembly; and
curing the composite assembly so that the first uncured composite part compacts and reduces in thickness while the solid internal mandrel and the thermal expansion insert each increase in size to apply pressure to the first uncured composite part and fill a volume, created by compaction of the first uncured composite part.

18. The method of claim 17, further comprising mechanically attaching the thermal expansion insert into the cavity of the layup tool body.

19. The method of claim 17 further comprising locating a package, comprising the solid internal mandrel, inserted onto the first uncured composite part, and the first uncured composite part, positioned onto the thermal expansion insert, for placement into the layup tool body using an attachment element of the thermal expansion insert.

20. The method of claim 17, wherein:
the layup tool body comprises a material with a first coefficient of thermal expansion;
the thermal expansion insert comprises a material that has a second coefficient of thermal expansion;
the solid internal mandrel comprises a material that has a third coefficient of thermal expansion; and
the second coefficient of thermal expansion and the third coefficient of thermal expansion are greater than the first coefficient of thermal expansion.

* * * * *